(12) United States Patent
Jahagirdar et al.

(10) Patent No.: US 10,429,913 B2
(45) Date of Patent: **\*Oct. 1, 2019**

(54) CONTROLLING POWER DELIVERY TO A PROCESSOR VIA A BYPASS

(71) Applicant: Intel Corporation, Santa Clara, CA (US)

(72) Inventors: Sanjeev S. Jahagirdar, Folsom, CA (US); Satish K. Damaraju, El Dorado Hills, CA (US); Yun-Han Chen, El Dorado Hills, CA (US); Ryan D. Wells, Raleigh, NC (US); Inder M. Sodhi, Folsom, CA (US); Vishram Sarurkar, Folsom, CA (US); Ken Drottar, Portland, OR (US); Ashish V. Choubal, Austin, TX (US); Rabiul Islam, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,964

(22) Filed: Aug. 7, 2018

(65) Prior Publication Data

US 2018/0341306 A1 Nov. 29, 2018

Related U.S. Application Data

(63) Continuation of application No. 15/804,020, filed on Nov. 6, 2017, now Pat. No. 10,146,283, which is a (Continued)

(51) Int. Cl.
*G06F 1/26* (2006.01)
*G06F 1/32* (2019.01)
(Continued)

(52) U.S. Cl.
CPC .............. *G06F 1/26* (2013.01); *G06F 1/3243* (2013.01); *G06F 1/3296* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS

| 5,163,153 A | 11/1992 | Cole et al. |
| 5,522,087 A | 5/1996 | Hsiang |

(Continued)

FOREIGN PATENT DOCUMENTS

| EP | 1 282 030 A1 | 5/2003 |
| WO | 2012104673 A1 | 8/2012 |

OTHER PUBLICATIONS

Intel Developer Forum, IDF2010, Opher Kahn, et al., "Intel Next Generation Microarchitecture Codename Sandy Bridge: , New Processor Innovations," Sep. 13, 2010, 58 pages.

(Continued)

*Primary Examiner* — Zahid Choudhury
(74) *Attorney, Agent, or Firm* — Trop, Pruner & Hu, P.C.

(57) ABSTRACT

In one embodiment, a processor includes a plurality of domains each to operate at an independently controllable voltage and frequency, a plurality of linear regulators each to receive a first voltage from an off-chip source and controllable to provide a regulated voltage to at least one of the plurality of domains, and a plurality of selectors each coupled to one of the domains, where each selector is configured to provide a regulated voltage from one of the linear regulators or a bypass voltage to a corresponding domain. Other embodiments are described and claimed.

20 Claims, 8 Drawing Sheets

Related U.S. Application Data continuation of application No. 13/906,652, filed on May 31, 2013, now Pat. No. 9,823,719.

(51) Int. Cl.
    *G06F 1/3234*     (2019.01)
    *G06F 1/3296*     (2019.01)
    *G06F 9/50*     (2006.01)

(52) U.S. Cl.
    CPC .......... *G06F 9/5094* (2013.01); *Y02D 10/152* (2018.01); *Y02D 10/172* (2018.01); *Y02D 10/22* (2018.01)

(58) Field of Classification Search
    CPC ....... G06F 1/3289; G06F 1/266; H04L 12/12; H04L 12/10
    See application file for complete search history.

(56) References Cited

U.S. PATENT DOCUMENTS

| | | |
|---|---|---|
| 5,568,440 A * | 10/1996 | Tsukude ................ G11C 5/147 365/189.09 |
| 5,590,341 A | 12/1996 | Matter |
| 5,621,250 A | 4/1997 | Kim |
| 5,931,950 A | 8/1999 | Hsu |
| 6,005,819 A | 12/1999 | Shin |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,391,193 B2 | 6/2008 | Wang et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 7,750,674 B2 | 7/2010 | Shumarayev |
| 7,765,418 B2 | 7/2010 | Mann |
| 8,494,477 B2 | 7/2013 | Ravichandran et al. |
| 8,629,713 B2 | 1/2014 | Pietri et al. |
| 8,635,470 B1 | 1/2014 | Kraipak et al. |
| 9,728,231 B1 | 8/2017 | Lee et al. |
| 2001/0044909 A1 | 11/2001 | Oh et al. |
| 2002/0040444 A1 | 4/2002 | Ohie |
| 2002/0194509 A1 | 12/2002 | Plante et al. |
| 2003/0061383 A1 | 3/2003 | Zilka |
| 2003/0071657 A1 | 4/2003 | Soerensen et al. |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0070673 A1 | 3/2007 | Borkar et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0104425 A1 | 5/2008 | Gunther |
| 2008/0250260 A1 | 10/2008 | Tomita |
| 2008/0276026 A1 | 11/2008 | Branover |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0161943 A1 | 6/2010 | Young Su |
| 2010/0191997 A1 | 7/2010 | Dodeja et al. |
| 2011/0148386 A1 | 6/2011 | Dhuyvetter et al. |
| 2011/0154090 A1 | 6/2011 | Dixon et al. |
| 2011/0228622 A1 | 9/2011 | Coteus |
| 2012/0079290 A1 | 3/2012 | Kumar |
| 2012/0167109 A1 | 6/2012 | Muralidhar et al. |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0300386 A1 | 11/2013 | Priel |
| 2013/0321071 A1 | 12/2013 | Pietri |
| 2013/0346774 A1 | 12/2013 | Bhandaru et al. |
| 2014/0068290 A1 | 3/2014 | Bhandaru et al. |
| 2014/0089690 A1 | 3/2014 | Fukuda |
| 2014/0195829 A1 | 7/2014 | Bhandaru et al. |
| 2014/0208141 A1 | 7/2014 | Bhandaru et al. |
| 2014/0223205 A1 | 8/2014 | Muthukaruppan |
| 2014/0258760 A1 | 9/2014 | Wells |
| 2014/0281593 A1 | 9/2014 | Hayes |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies for Kalman Filtering and Smoothing," 1996, pp. 1-21.

(56) References Cited

OTHER PUBLICATIONS

R.E. Kalman, "A New Approach to Linear Filtering and Prediction Problems," 1960, pp. 1-12.

Intel Corporation, "Intel 64 and IA-32 Architectures Software Developers Manual," vol. 3 (3A, 3B & 3C): System Programming Guide, Feb. 2014, Chapter 14 Power and Thermal Management (14.1-14.9.5), 44 pages.

Intel Corporation, "Intel 64 and IA-32 Architectures Software Developers Manual," vol. 3B: System Programming Guide, Part 2, Apr. 2016, Chapter 14 Power and ThermalManagement (14.1-14.9.5), 42 pages.

United States Patent and Trademark Office, Non-Final Office Action dated Jan. 25, 2019 and Reply filed Apr. 18, 2019 in U.S. Appl. No. 16/056,949.

\* cited by examiner

CONTROLLING POWER DELIVERY TO A PROCESSOR VIA A BYPASS

This application is a continuation of U.S. patent application Ser. No. 15/804,020, filed Nov. 6, 2017, which is a continuation of U.S. patent application Ser. No. 13/906,652, filed May 31, 2013, which is now U.S. Pat. No. 9,823,719, issued Nov. 21, 2017, the content of which is hereby incorporated by reference.

TECHNICAL FIELD

Embodiments relate to power management of a system, and more particularly to operating voltage control in a processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, a processor is configured to receive one or more voltages from an external or off-chip source. In turn, these voltages can be provided directly to one or more domains of the processor, or these voltages may instead further be conditioned on-die prior to delivery to such domains. Although the scope of the present invention is not limited in this regard, in an embodiment a processor is coupled to receive one or more incoming voltages from one or more external voltage regulators via corresponding external voltage rails. In turn, the external voltage rails may be coupled to internal voltage rails that can be configured to couple to on-chip voltage regulators such as on-die linear regulators or, via bypass paths, be provided directly to a corresponding domain. By providing an external voltage directly to a domain without on-die conditioning by way of an on-die voltage regulator, power efficiency losses that otherwise would be consumed by the on-die regulator can be avoided.

As will be described further herein, embodiments may also provide for dynamic control of voltage delivery to one or more domains to thus enable voltage delivery directly from an off-chip voltage when a given domain is controlled to operate at or substantially close to this off-chip voltage. Instead when a domain is controlled to operate at a different voltage, a voltage provided from off-chip can be further conditioned on-die and thereafter provided to the domain.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine and one or more domains associated with non-core circuitry. Although many implementations of a multi-domain processor can be formed on a single semiconductor die, other implementations can be realized by a multi-chip package in which different domains can be present on different semiconductor die of a single package.

Figure 1:
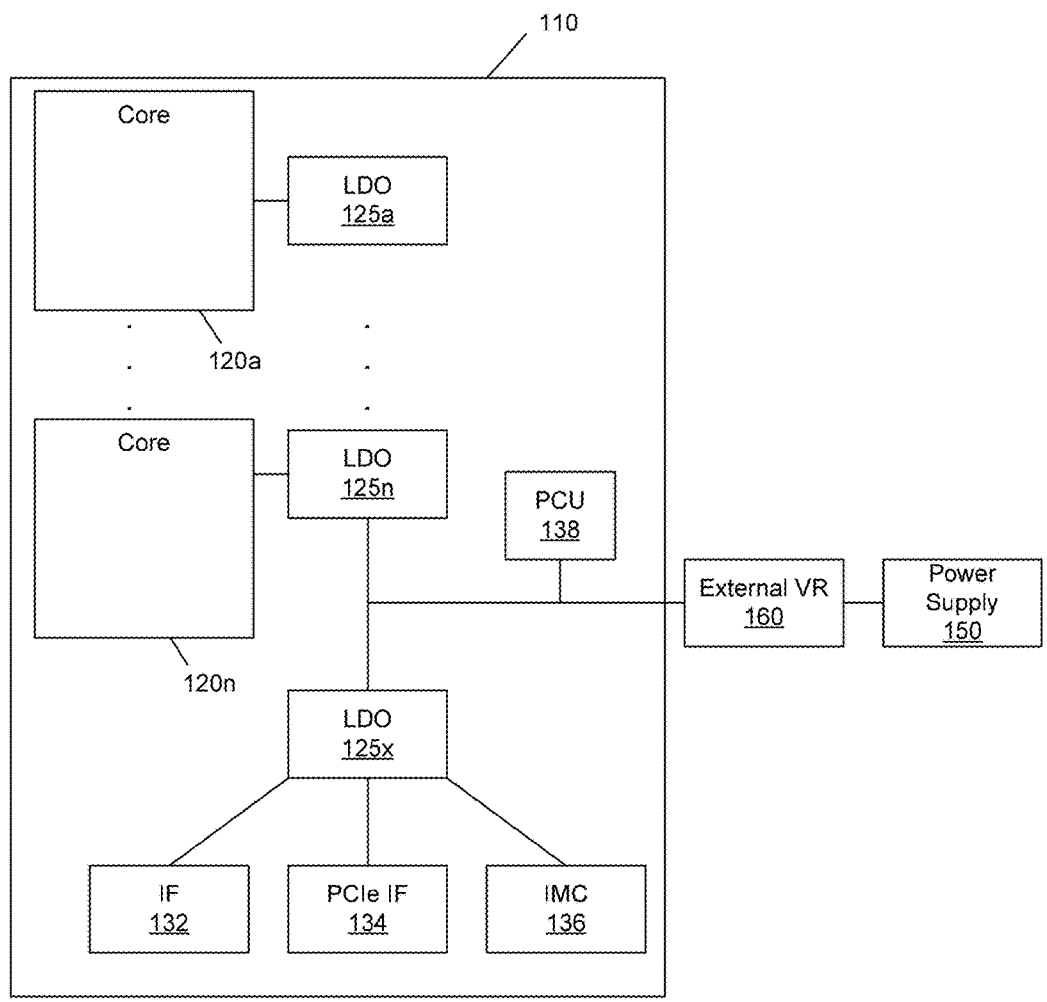
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor socket including multiple core units 120a-120n. In an embodiment, each core unit may include multiple cores, a cache memory, an interface unit and so forth. In addition, each core may be associated with an individual low dropout regulator (LDO) 125a-125n to allow for fine-grained control of voltage and thus power and performance of each individual core unit. Although shown as being LDOs, it is understood that in other embodiments the on-die regulators may be other types of linear regulators. In an embodiment, each LDO may be individually controlled in a first mode to be engaged to further regulate a voltage provided to a domain such as a core, or in a second mode to be disabled and bypassed such that the received external voltage is provided via a bypass path to the domain without further regulation. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another LDO 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to determine operating voltage levels for each of the cores and other agents of the processor and to dynamically and independently enable or disable corresponding LDOs based at least in part on the determined operating voltage and the regulated voltage provided by the external voltage regulator(s) in accordance with an embodiment of the present invention. Furthermore, PCU 138 may be coupled via a dedicated interface to external voltage regulator 160 to issue control signals to the external voltage regulator. Also in some embodiments, PCU 138 may further couple to a platform power management controller such as a separate power management integrated circuit (PMIC). PCU 138 may couple directly to such PMIC by an I$^2$C bus and/or a voltage control (e.g., SVID) bus. While not shown for ease of illustration, understand that additional components may be present within processor 110 such as additional uncore logic and other components such as internal memories, e.g., one or more levels of a cache memory hierarchy and so forth.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the LDO control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different activity or power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). For the various P-states and C-states, it may be possible to operate cores and other processor agents at varying operating voltages to meet the requested performance level at a minimal power consumption level.

Figure 2:
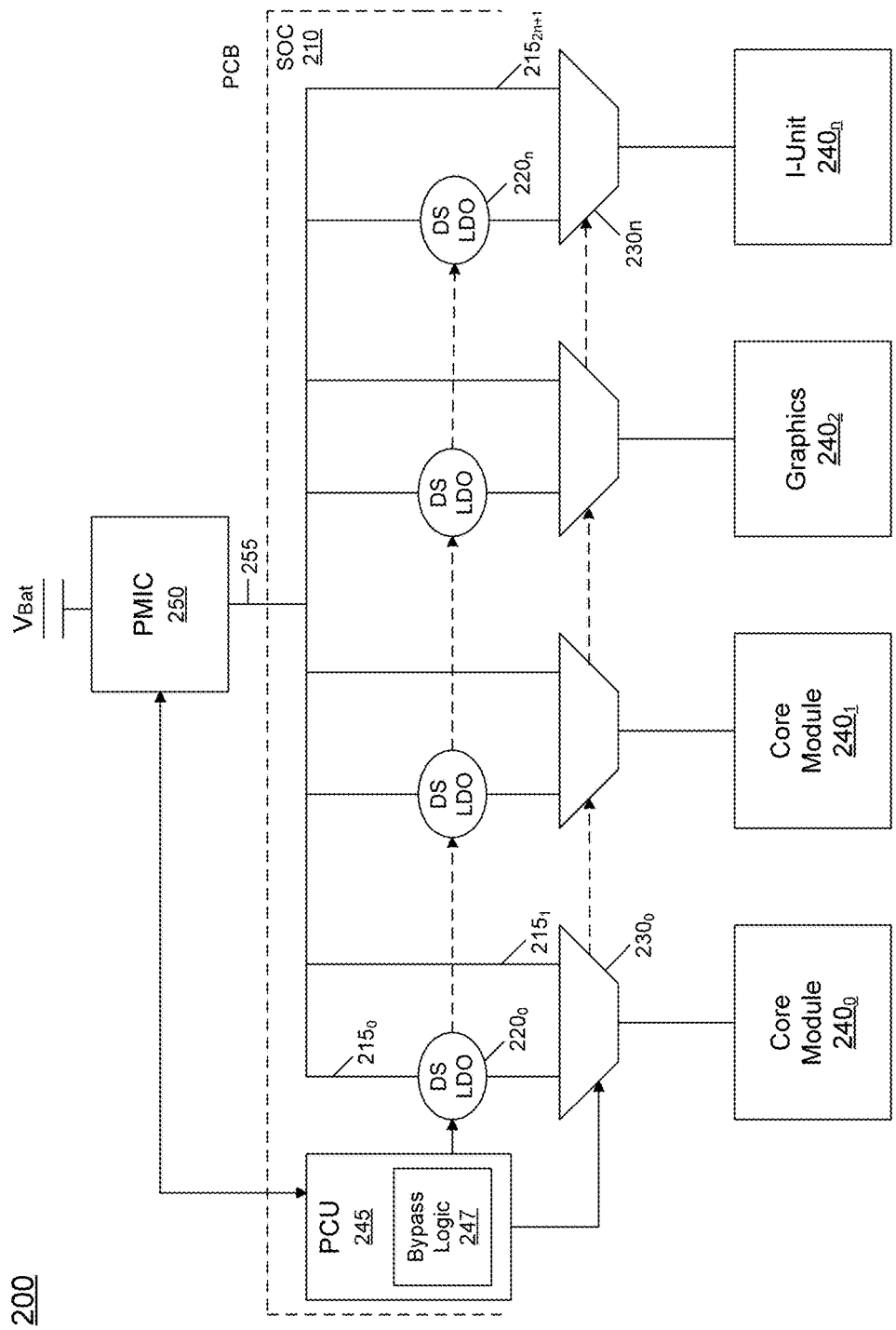
FIG. 2 is a block diagram of a system in accordance with an embodiment of the present invention.

Referring now to FIG. 2, shown is a block diagram of a system in accordance with an embodiment of the present invention. As shown in FIG. 2, system 200 includes a processor 210, which in the implementation shown is a system on chip (SoC). However, understand that embodiments are not limited in this regard and may be applicable to any type of multi-domain processor such as a multicore processor, which may further include additional compute engines and/or other agents.

In the high level view shown in FIG. 2, SoC is coupled to a power management integrated circuit (PMIC) 250 via a voltage rail 255. PMIC 250 may be a primary power controller for the system, which in some embodiments may be a portable computing device. As seen in FIG. 2, PMIC 250 receives a battery voltage directly in an implementation in which system 200 is a battery powered portable device such as a smartphone, tablet computer, laptop computer such as an Ultrabook™ computer, or another portable computing device. Note in some implementations an additional VR may be present between the battery and the PMIC. As an example, if the battery output voltage is very high (e.g., for 2 series stacked battery) one stage of DC-DC conversion may be provided to enable the PMIC internal blocks to operate on a lower voltage.

As seen, processor 210 includes multiple voltage rails $215_0$-$215_{2n+1}$ each of which is coupled to receive a voltage from external voltage rail 255 and provide it to a selected destination. More specifically, some of these voltage rails are coupled to corresponding on-chip voltage regulators which in the embodiment shown are implemented as digitally synthesizable low drop out linear voltage regulators (LDOs) $220_0$-$220_n$. Others of these voltage rails are implemented as bypass paths that directly provide the received off-chip voltage to a given selector $230_0$-$230_n$. In turn, each of these selectors, which may be implemented as multiplexers, is coupled to a corresponding domain $240_0$-$240_n$. In the example shown, processor 210 includes multiple core modules $240_0$-$240_1$, a graphics unit $240_2$ and an image processing unit $240_n$. While shown with these particular domains in the embodiment of FIG. 2, understand the scope of the present invention is not limited in this regard and the number and types of independent domains within a processor can vary.

Thus each domain 240 is configured to receive an operating voltage via a corresponding selector 230. Both selectors 230 and LDOs 220 are in turn controlled by an internal power controller, which in the embodiment of FIG. 2 is a PCU 245. Based on determination of an appropriate operating voltage level for each of the domains, PCU 245 may appropriately control a corresponding LDO 220 and selector 230 to provide a determined operating voltage to the corresponding domain. In an embodiment, PCU 245 communicates with PMIC 250 to set the external voltage rail value to the maximum of all the internal LDO domains connected to that rail. If all the LDO domains request the same voltage, the LDOs are bypassed and this off-chip voltage, also referred to herein as a bypass voltage, is passed through to the on-die domains. Thus, if the determined operating voltage is the same as or substantially the same as the received off-chip voltage, the corresponding LDO 220 may be turned off and the corresponding bypass path 215 provides the operating voltage via a given selector 230. In this way, the efficiency loss from LDO 220 can be avoided.

Still referring to FIG. 2, note further that a direct communication channel between PCU 245 and PMIC 250 may be present. In an embodiment this channel may be implemented as an I²C bus or as an SVID bus to provide requested operating voltage levels (e.g., in the form of voltage identification values) to PMIC 250 to cause it to control the voltage on corresponding voltage rail 255.

PCU 245 may include bypass logic 247 that may receive operating voltage level assignments determined in PCU 245 and determine whether a received regulated voltage via external PMIC 250 may be delivered via a given bypass path directly to a given domain without the need for further regulation in a corresponding LDO 220. In this way, bypass logic may send control signals to control corresponding LDOs 220 to be enabled or disabled and to operate at a given operating voltage level to generate an appropriate regulated voltage and further to provide control signals to selectors 230 to cause either the bypass voltage or a regulated voltage to be provided to the corresponding domain. Note that although shown at this high level in the embodiment of FIG. 2, embodiments are not so limited. For example, instead of providing a dedicated LDO for each of the domains, one on-die LDO may provide an operating voltage to multiple domains. Furthermore, at least some domains may be controlled to be directly powered using an off-chip voltage such that the need for an on-die regulator for such domains can be avoided. And there can be variations for a given system between use of on-die voltage regulators and off-chip voltage sources. Still further understand that in other embodiments at least some of the logic for performing bypass operations as described herein may be implemented in the PMIC such that communication between PMIC 250 and PCU 245 occurs to determine appropriate operating voltages for the different domains and to determine whether to provide the determined operating voltage to the domain from the on-chip LDO or via an off-chip voltage source and to provide control signals to enable such operation.

Figure 3:
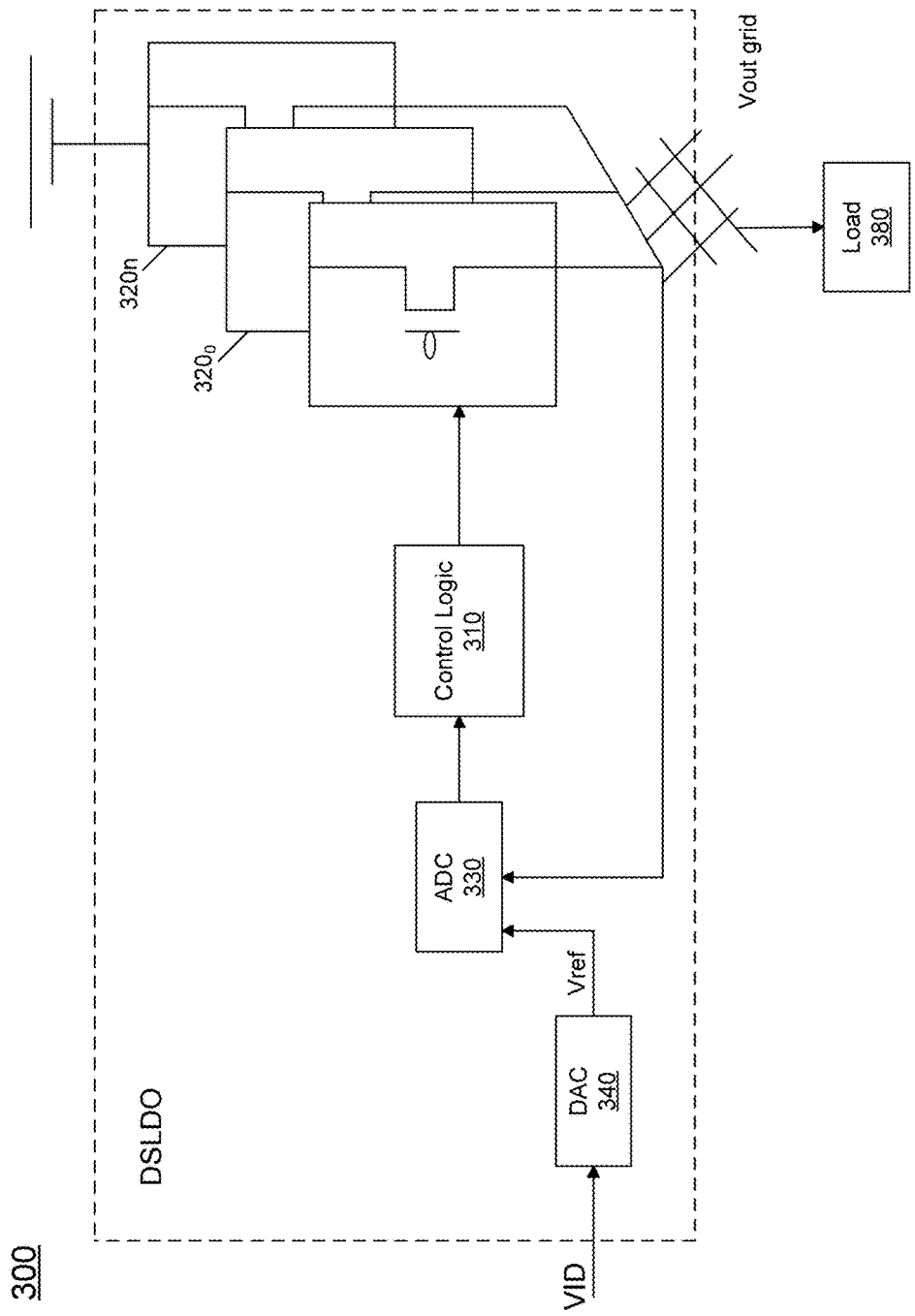
FIG. 3 is a block diagram of an on-die voltage regulator in accordance with an embodiment of the present invention.

Referring now to FIG. 3, shown is a block diagram of an on-die voltage regulator in accordance with an embodiment of the present invention. As shown in FIG. 3, voltage regulator 300 is a digitally synthesizable on-die linear voltage regulator (DSLDO). Although the embodiment shown is an LDO, understand that other types of switching voltage regulators may equally be used. As seen, voltage regulator 300 receives an external voltage supply, which is coupled to a plurality of power gates $320_0$-$320_n$. In an embodiment these power gates can be implemented as metal oxide semiconductor field effect transistors (MOSFETs), e.g., p-channel MOSFETs. DSLDO 300 regulates the operating voltage by modulating the number of active power gate transistors 320. Note also that DSLDO 300 does not add any voltage drop over the power gates. These parallel-connected transistors may be controlled via a control logic 310 such that based on a requested operating voltage, a selected number of these power gates 320 are enabled to provide an operating voltage to a load 380. As an example, the load may be a single domain of the processor. Control logic 310 is in turn configured to receive a digital control voltage output by a comparator 330. In an embodiment comparator 330 may be implemented with an analog-to-digital converter (ADC) and a comparator that receives a feedback value from the operating voltage output by regulator 300 and a reference signal in turn received via a digital-to-analog converter (DAC) 340. As seen, DAC 340 receives a voltage control signal such as a voltage ID (VID) signal received from, e.g., a PCU or other power controller of the processor. Thus regulator 300 operates to output an operating voltage at a level requested by a power controller of the processor. Not shown for ease of illustration is a disable control signal (which may be the same signal as the control signal sent to the multiplexers in FIG. 2).

Figure 4:
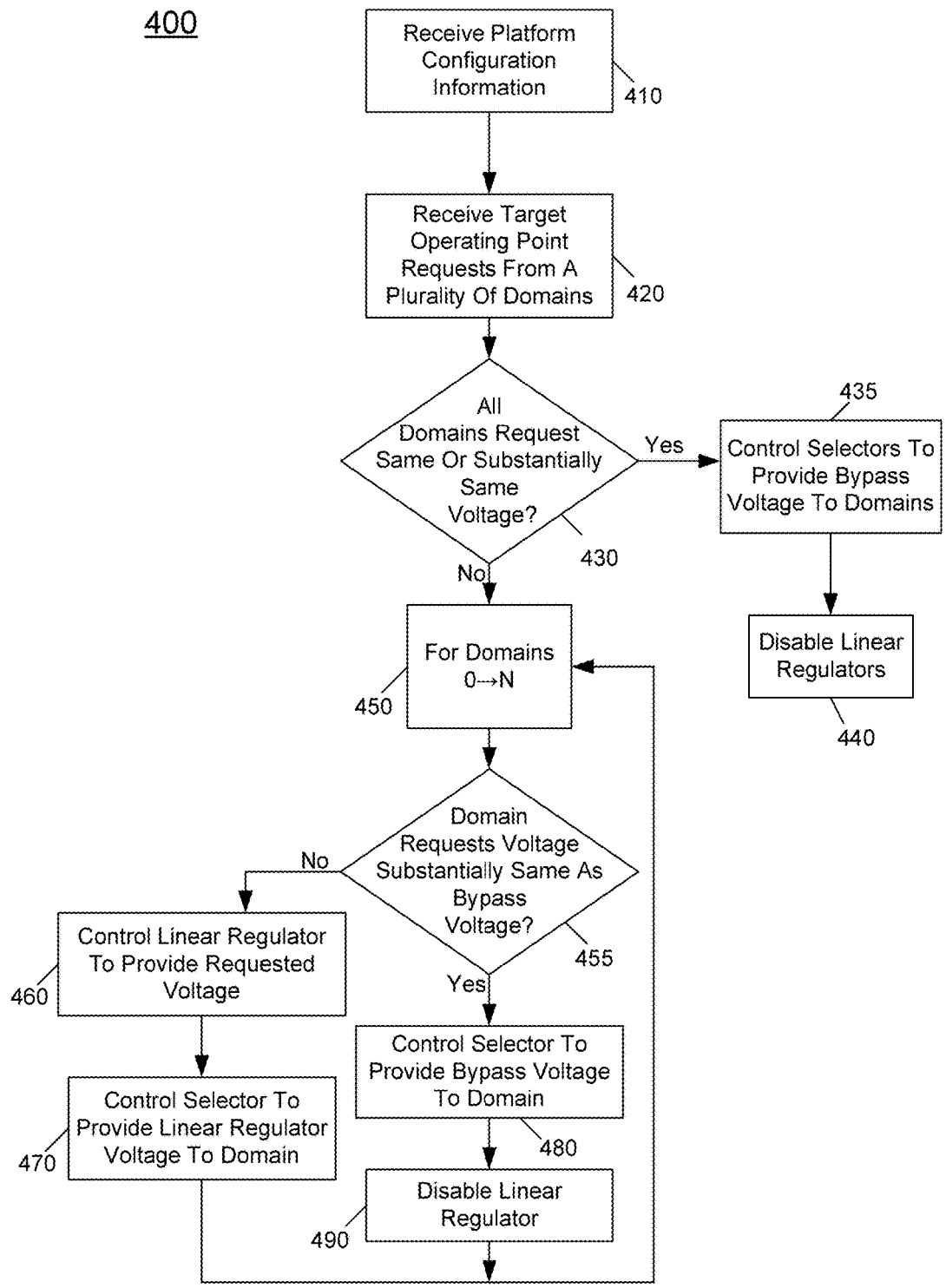
FIG. 4 is a flow diagram of a method for controlling operating voltages of a processor in accordance with an embodiment of the present invention.

Referring now to FIG. 4, shown is a flow diagram of a method for controlling operating voltages of a processor in accordance with an embodiment of the present invention. As shown in FIG. 4, method 400, which may be implemented within logic of a PCU such as a combination voltage control logic/bypass logic, may generally be used to determine an operating voltage for one or more domains of the processor and control both on-chip and off-chip components to provide that operating voltage to the domain.

As seen in FIG. 4, method 400 begins by receiving platform configuration information (block 410). Although the scope of the present invention is not limited in this regard in an embodiment such platform configuration information may include a mapping of the number of off-die voltage rails for a given platform to the number of on-die voltage rails. In some implementations a 1:1 mapping may exist, while in other implementations a single off-chip voltage rail may couple to a plurality of on-die voltage rails. Additional configuration information such as maximum operating voltages, frequencies, and other processor constraints may also be provided. Control next passes to block 420 where a target operating point request may be received from multiple domains. These target operating point requests may be received, e.g., from a voltage control logic of the PCU. In turn, the operating voltage requests may originate from an OS, other system software or the domains themselves and may correspond to a requested operating point including operating voltage and operating frequency. Understand that such requests may be accepted, or voltage control logic may not allow a given operating voltage request to be fulfilled, depending on various constraints under which a processor is operating.

Next control passes to diamond 430 to determine whether all domains request the same or substantially the same voltage. If this is the case, control passes to block 435 where various selectors may be controlled to provide a bypass voltage to the domains. For example with reference back to FIG. 2, selectors 230 each may be controlled to provide a bypass voltage received via a bypass path to the corresponding domain. As such, the various linear regulators that would otherwise be used to provide an operating voltage to these domains may be disabled (block 440). As an example, the PCU may send control signals to the linear regulators to cause them to be powered down, thus improving power efficiency.

Still referring to FIG. 4, if instead not all domains request the same or substantially the same voltage, control passes to a loop beginning at block 450. There the loop can be executed for each domain under analysis. First at diamond 455 it can be determined whether a domain requests a voltage that is the same or substantially the same as the bypass voltage. If not, control passes to block 460 where the linear regulator may be controlled to provide the requested voltage. As an example, the PCU can send a voltage control signal such as a given VID code to the corresponding LDO to cause it to output the requested operating voltage to the corresponding domain. As seen, control then passes to block 470 where the selector associated with this domain may be controlled to provide the voltage from this linear regulator to the domain.

Otherwise if at diamond 455 it is determined that the requested voltage of a domain is the same as or substantially the same as the bypass voltage, control next passes to block 480 where the selector can be controlled to provide the bypass voltage itself to the domain. As such, the PCU may further control the LDO to be disabled (block 490), thus increasing power efficiency and reducing power consumption. Although shown at this high level in the embodiment of FIG. 4, understand the scope of the present invention is not limited in this regard.

Embodiments thus provide a flexible method of providing multiple on-die voltage domains and mapping them to one or more external power rails. Embodiments may also avoid the efficiency loss from an added voltage regulator. In addition, using an embodiment of the present invention a small form factor device that cannot provide multiple power rails due to platform size constraints can effectively perform power delivery using a single external voltage rail.

Using an embodiment, a system designer can determine the number of platform rails to be used for the compute engines. As an example, the platform can consolidate multiple DSLDO domains on one rail for cost, form factor reasons or so forth. A designer also may choose to have multiple rails for the compute engines if the battery technology and/or the platform size allow it, to extract greater performance.

Figure 5:
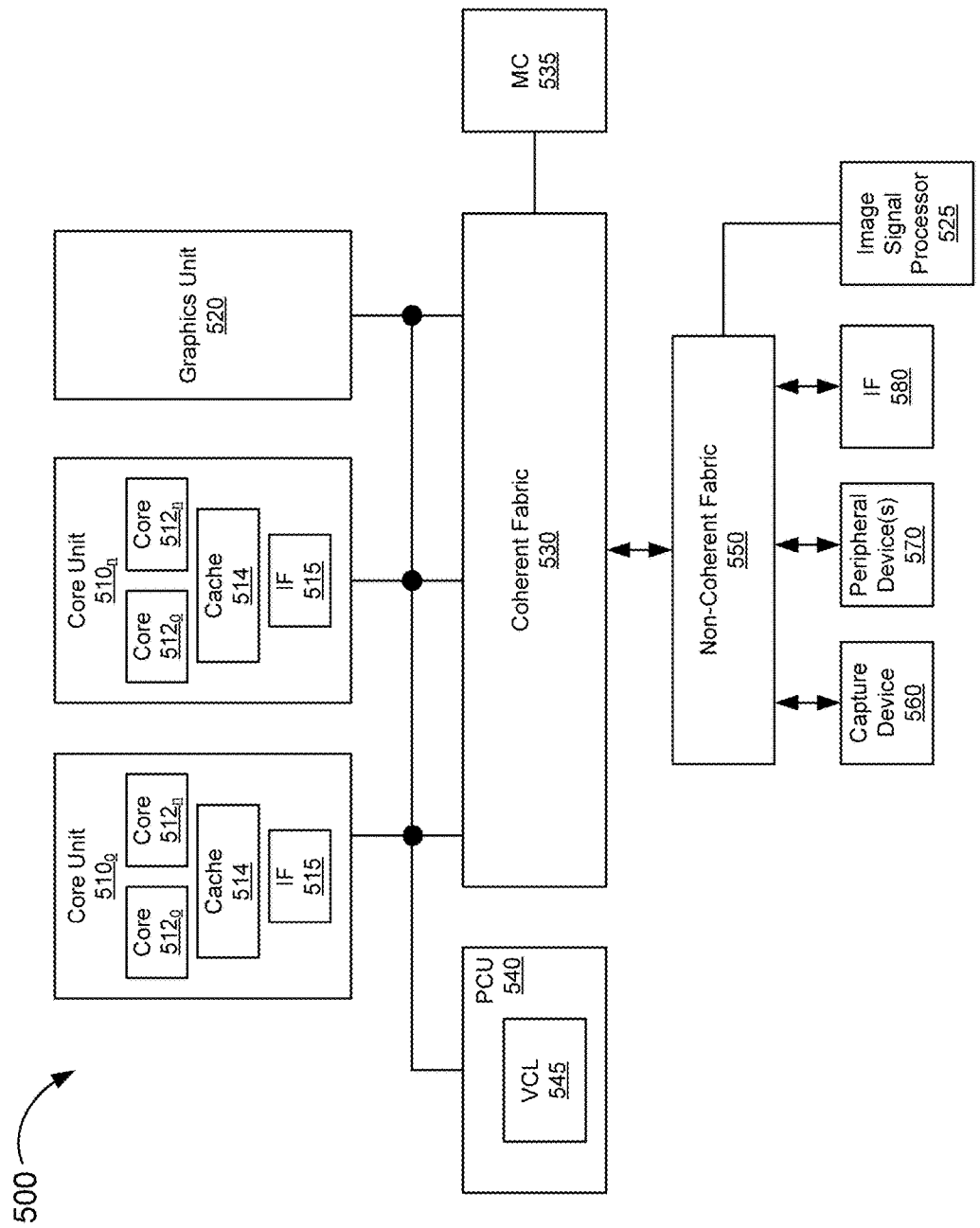
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. In the embodiment of FIG. 5, processor 500 may be a system on a chip (SoC) including multiple domains, each of which may be coupled to receive an operating voltage that can either be from a bypass path obtained from an external voltage regulator or from an on-chip LDO. Note also that the voltage delivery may be dynamically controlled such that each domain receives its operating voltage from either the LDO or from an off-chip source, depending on a determined operating voltage for the domain. Such SoC may be used in a low power system such as a smartphone, tablet computer, Ultrabook™ computer or other portable computing device.

In the high level view shown in FIG. 5, processor 500 includes a plurality of core units $510_0$-$510_n$. Each core unit may include one or more processor cores $512_0$-$512_n$. In addition, each such core may be coupled to a cache memory 514 which in an embodiment may be a shared level (L2) cache memory. As further shown, each core unit 510 includes an interface 515 such as a bus interface unit to enable interconnection to additional circuitry of the processor. Specifically as shown, each core unit 510 couples to a coherent fabric 530 that may act as a primary cache coherent on-die interconnect that in turn couples to a memory controller 535. In turn, memory controller 535 controls communications with a memory such as a dynamic random access memory (DRAM) (not shown for ease of illustration in FIG. 5).

In addition to core units, additional processing engines are present within the processor, including at least one graphics unit 520 which may include one or more graphics processing units (GPUs) to perform graphics processing as well as to possibly execute general purpose operations on the graphics processor (so-called GPGPU operation).

As seen, all of these various processing units, including core units 510 and graphics unit 520 couple to coherent fabric 530. In addition, each of the units may have its power consumption controlled via a power control unit 540. PCU 540 includes a voltage control logic 545 to determine appropriate operating voltage for each of the domains (and in some embodiments, sub-units of the domains), e.g., based on an available power budget and request for given performance and/or low power state and further to perform dynamic operating voltage selection to be via a bypass path or an on-chip linear regulator as described herein. In this way, when a determined operating voltage for a domain is the same or substantially the same as a regulated voltage provided by a voltage rail, the corresponding linear regulator may be powered down, reducing power consumption.

As further seen in FIG. 5, coherent fabric 530 couples to a non-coherent fabric 550 to which various peripheral devices may couple. In the embodiment shown in FIG. 5, these devices include a capture device 560, such as an on-chip camera, one or more peripheral devices 570, and one or more interfaces 580 such as a PCIe™ interface to enable communication with one or more off chip devices, e.g., according to the PCIe™ communication protocol. In addition, at least one image signal processor 525 may be present. Signal processor 525 may be configured to process incoming image data received from one or more capture devices, either internal to the SoC or off-chip. Although shown at this high level, in the embodiment of FIG. 5, understand the scope of the present invention is not limited in this regard.

Figure 6:
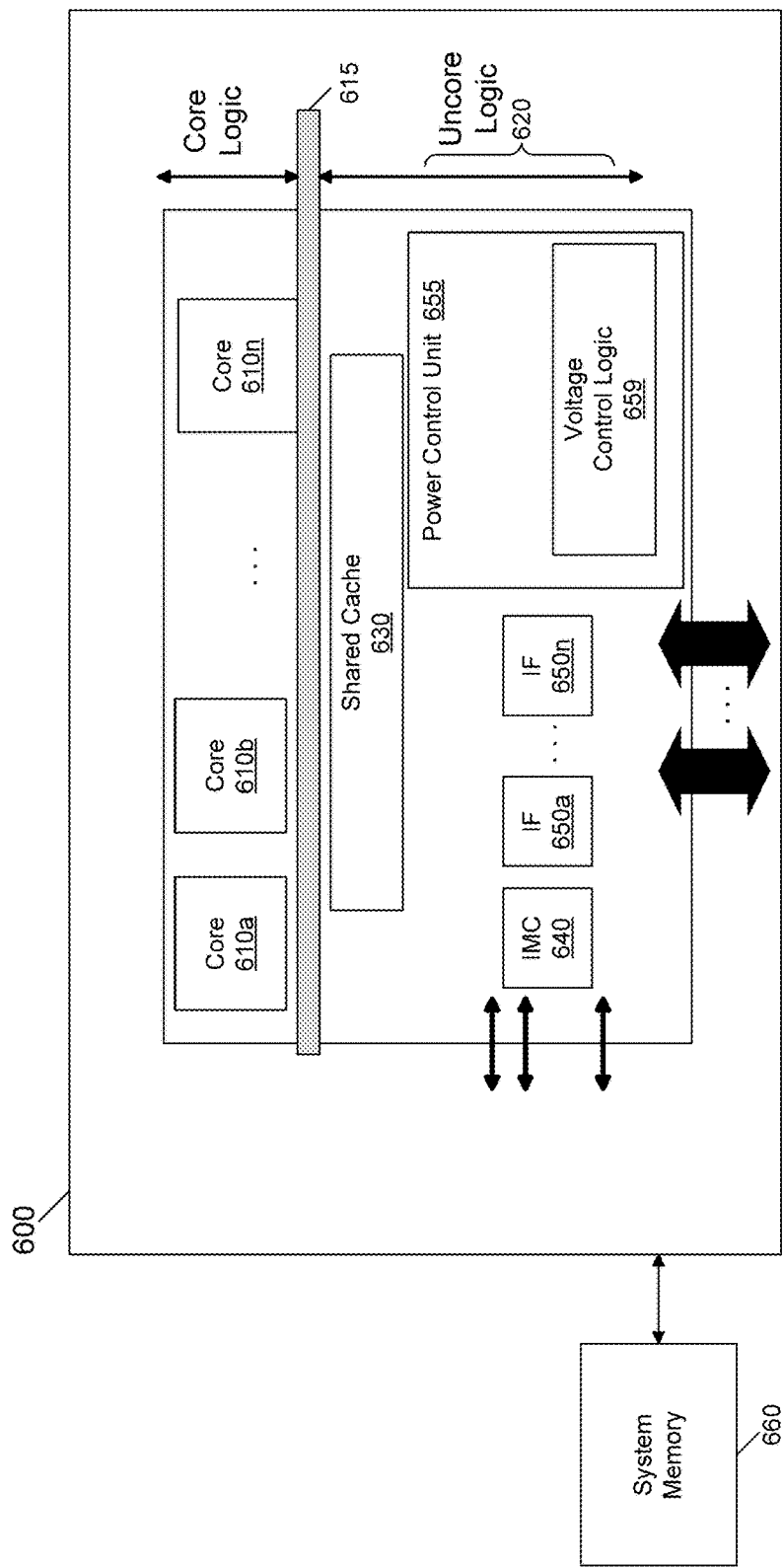
FIG. 6 is a block diagram of a processor in accordance with another embodiment of the present invention.

Referring now to FIG. 6, shown is a block diagram of a processor in accordance with another embodiment of the present invention. As shown in FIG. 6, processor 600 may be a multicore processor including a plurality of cores 610a-610n. In one embodiment, each such core may be of a single domain or an independent power domain and can be configured to enter and exit active states and/or turbo modes based on workload and to operate at an operating voltage received either from an on-chip linear regulator or an off-chip source. The various cores may be coupled via an interconnect 615 to a system agent or uncore 620 that includes various components. As seen, the uncore 620 may include a shared cache 630 which may be a last level cache. In addition, the uncore may include an integrated memory controller 640, various interfaces 650 and a power control unit 655.

In various embodiments, power control unit 655 may include a voltage control logic 659 in accordance with an embodiment of the present invention. As described above, this logic is configured to determine an appropriate operating voltage for each domain of the processor and to individually enable one or more on-chip linear regulators to provide that operating voltage or to enable a pass through voltage received from an off-chip source to be provided to the given domain (and disable the corresponding on-chip regulator).

With further reference to FIG. 6, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 6, the scope of the present invention is not limited in this regard.

Figure 7:
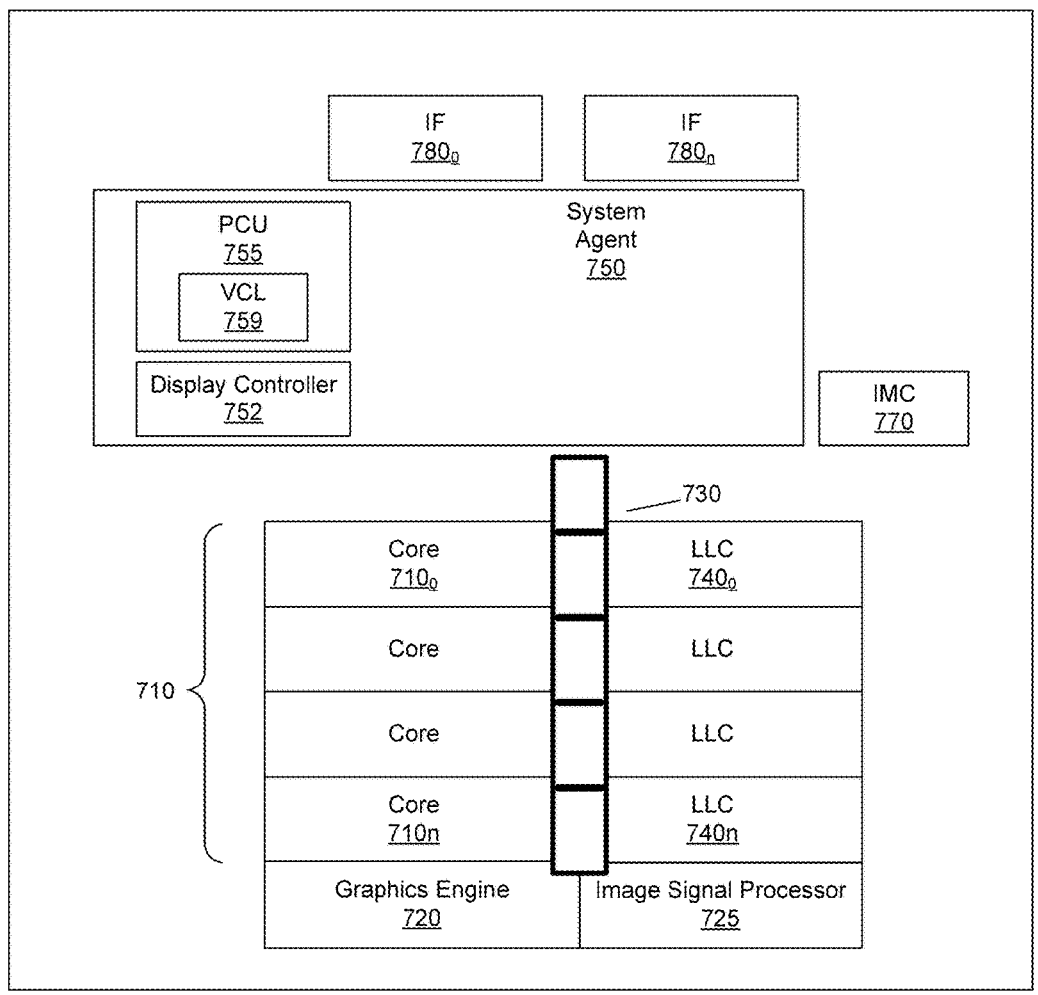
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 700 includes multiple domains. Specifically, a core domain 710 can include a plurality of cores $710_0$-$710_n$, a graphics domain 720 can include one or more graphics engines, and an image signal processor domain 725 may include at least one image signal processor. In addition, a system agent domain 750 may further be present. Each domain may be dynamically controlled to be powered by an independent rail via a bypass path or by an independent on-chip linear regulator, in an embodiment. In another embodiment, multiple domains such as the graphics and image processing domains may be powered by a common rail and/or linear regulator while the core domain is powered by an independent rail and/or linear regulator. In some embodiments, system agent domain 750 may execute at an independent frequency and may remain powered on at all times to handle power control events and power management such that domains 710, 720, and 725 can be controlled to dynamically enter into and exit high power and low power states. Each of domains 710, 720 and 725 may operate at different voltage and/or power. Note that while only shown with four domains, understand the scope of the present invention is not limited in this regard and additional domains can be present in other embodiments. For example, multiple core domains may be present each including at least one core.

In general, each core 710 may further include low level caches in addition to various execution units and additional processing elements. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720, signal processor domain 725 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755 which can include a voltage control logic 759 in accordance with an embodiment of the present invention to enable delivery of an operating voltage dynamically from either an on-chip regulator or an off-chip source as described herein.

In various embodiments, this logic may be configured as in FIG. 2 and may execute the algorithm described above in FIG. 4.

As further seen in FIG. 7, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
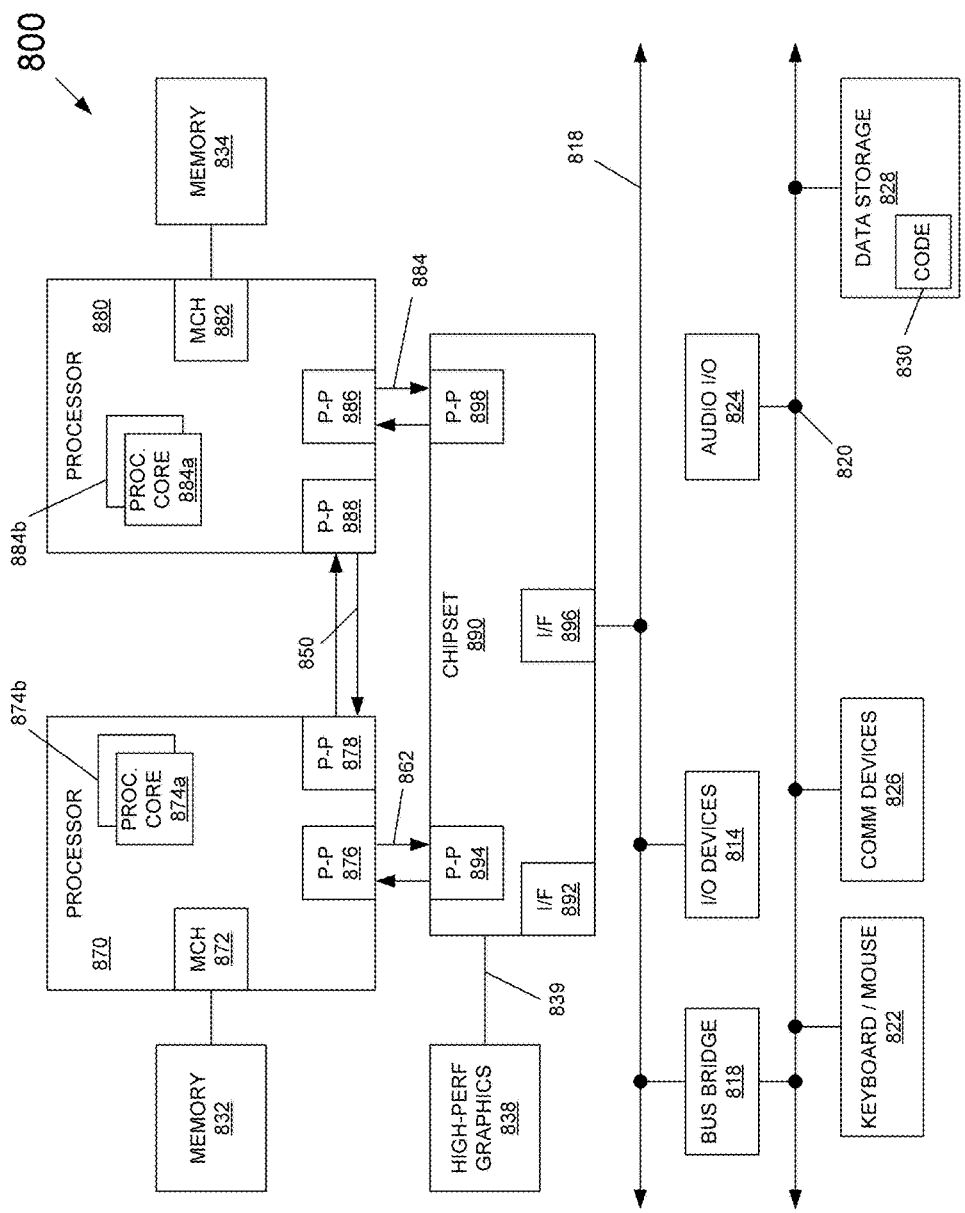
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. Each of the processors can include a PCU or other logic to perform dynamic operating voltage control to be either from an on-chip linear regulator or an off-chip regulated voltage source, as described herein.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 6, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

The following examples pertain to further embodiments.

In an example, a processor comprises a plurality of domains each to operate at an independently controllable voltage and frequency, a plurality of linear regulators each to receive a first voltage from an off-chip source and controllable to provide a regulated voltage to at least one of the plurality of domains, and a plurality of selectors each coupled to one of the plurality of domains, each of the plurality of selectors to provide a regulated voltage from one of the plurality of linear regulators or a bypass voltage to a corresponding one of the plurality of domains.

In another example, the processor further comprises a power control unit (PCU) to control each of the plurality of selectors based on a target operating point for the corresponding domain.

In another example, the PCU is to disable a first linear regulator when a first selector coupled to the first linear regulator is to provide the bypass voltage to a first domain coupled to the first selector.

In another example, the plurality of linear regulators are to receive the first voltage from a single voltage rail coupled to the processor.

In an example, the bypass voltage corresponds to the first voltage.

In an example, each of the plurality of linear regulators comprises a comparator to generate a comparison signal based on comparison of a reference voltage to the regulated voltage, a control logic to receive the comparison signal and to generate at least one control signal based at least in part thereon, and a plurality of power gates to receive the first voltage and to provide the regulated voltage responsive to the at least one control signal.

In another example, the PCU is to provide a digital voltage value to the linear regulator and the linear regulator is to generate the reference voltage responsive thereto.

In another example, when each of the plurality of domains is to operate at a substantially common voltage, the plurality of linear regulators are to be disabled.

In another example, the substantially common voltage is substantially equal to the first voltage.

In another example, a first one of the plurality of linear regulators is to be disabled when a corresponding first one of the plurality of domains is to operate at a voltage at least substantially equal to the first voltage.

In another example, the PCU is to communicate with a power management controller coupled to the processor, where the power management controller is to provide the first voltage to the processor via at least one external voltage rail. The PCU may provide a voltage identification value to the power management controller, and the power management controller is to provide the first voltage based at least in part on the voltage identification value. The power management controller may be coupled to the processor via a single external voltage rail and the processor comprises a plurality of internal voltage rails including a first set of voltage rails each coupled to an input of one of the plurality of linear regulators and a second set of voltage rails each coupled to one of the plurality of selectors.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In an example, a method comprises receiving, in a power controller of a multicore processor, target operating point requests from a plurality of domains of the multicore processor, responsive to the plurality of domains requesting the same or substantially the same operating voltage, providing a bypass voltage received via an external voltage rail to the plurality of domains, and disabling a plurality of linear regulators of the multicore processor.

In another example, the method further comprises receiving platform configuration information including information regarding one or more external voltage rails coupled to the multicore processor in the power controller and mapping the one or more external voltage rails to a plurality of on-chip voltage rails.

In another example, the method further comprises responsive to the plurality of domains not requesting the same or substantially the same operating voltage, controlling a first selector coupled to receive the bypass voltage and a regulated voltage provided by a first one of the plurality of linear regulators to provide the regulated voltage to a first domain of the plurality of domains.

In another example, the method further comprises controlling the first selector to provide the bypass voltage to the first domain and disabling the first linear regulator responsive to the first domain requesting an operating voltage the same or substantially the same as the bypass voltage.

In another example, the method further comprises responsive to the target operating point requests, determining a maximum operating voltage requested by the plurality of domains and communicating the maximum operating voltage to a platform power controller to cause a voltage rail coupled the platform power controller to provide the bypass voltage at the maximum operating voltage.

In another example, a machine-readable medium having stored thereon instructions, which if performed by a machine cause the machine to perform a method according to any of the above examples.

In an example, an apparatus comprises means to perform a method according to any of the above examples.

In an example, a system comprises a multicore processor including a plurality of domains each to operate at an independently controllable voltage and frequency, a plurality of linear regulators each to receive a first voltage and output a regulated voltage, a plurality of multiplexers each coupled to one of the plurality of domains, each of the plurality of multiplexers to provide a regulated voltage from one of the plurality of linear regulators or an external voltage to the corresponding one of the plurality of domains, and a power control unit (PCU) to control each of the plurality of multiplexers based at least in part on a target operating point for the corresponding domain, and a power management controller coupled to the multicore processor, where the power management controller is to provide the external voltage to the multicore processor via at least one external voltage rail.

In another example, the PCU is coupled to the power management controller to provide a voltage identification value to the power management controller, where the power management controller is to provide the external voltage based at least in part on the voltage identification value.

In another example, the PCU is to provide the voltage identification value to a first linear regulator of the plurality of linear regulators that comprises a comparator to generate a comparison signal based on comparison of a reference voltage to the regulated voltage, a control logic to receive the comparison signal and to generate at least one control signal based at least in part thereon, and a plurality of power gates to receive the external voltage and to provide the regulated voltage responsive to the at least one control signal.

In another example, the PCU is to disable the first linear regulator when a first domain coupled to the first linear regulator is to receive the external voltage.

In another example, the PCU is to disable the first linear regulator when the first domain is to operate at a voltage at least substantially equal to the external voltage.

In another example, the power management controller is coupled to the multicore processor via a single external voltage rail and the multicore processor comprises a plurality of internal voltage rails including a first set of voltage rails each coupled to an input of one of the plurality of linear regulators and a second set of voltage rails each coupled to one of the plurality of multiplexers.

In another example, the PCU is to enable a first linear regulator and a first multiplexer to provide a first regulated voltage to a first domain and to disable a second linear regulator and to enable a second multiplexer to provide the external voltage to a second domain.

In another example, the PCU is, responsive to target operating point requests for the plurality of domains, to determine a maximum operating voltage requested by the plurality of domains and communicate the maximum operating voltage to the power management controller to cause the external voltage to be equal to the maximum operating voltage.

In another example, the system further comprises a voltage regulator coupled to the power management controller, where the power management controller is to control the voltage regulator to generate the external voltage at a regulated voltage level.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor comprising;
a plurality of processor cores formed on a first die, including a first processor core and a second processor core, the first and second processor cores to operate at a corresponding controllable voltage and frequency;
a first integrated voltage regulator formed on the first die, the first integrated voltage regulator having a first input to receive a first input voltage from a first voltage rail and a first output to provide a first regulated voltage to the first processor core via a first operating voltage rail, the first integrated voltage regulator comprising:
first control circuitry to produce a first plurality of gate control signals; and
a first plurality of p-type MOSFETs (pFETs) coupled to the first control circuitry, each of the first plurality of pFETs to receive a corresponding one of the first plurality of gate control signals, the first plurality of pFETs to generate the first regulated voltage by regulating the first input voltage based on the first plurality of gate control signals received from the first control circuitry;
a second integrated voltage regulator formed on the first die, the second integrated voltage regulator having a second input to receive a second input voltage from a second voltage rail and a second output to provide a second regulated voltage to the second processor core via a second operating voltage rail, the second integrated voltage regulator comprising:
second control circuitry to produce a second plurality of gate control signals; and
a second plurality of pFETs coupled to the second control circuitry, each of the second plurality of pFETs to receive a corresponding one of the second plurality of gate control signals, the second plurality of pFETs to generate the second regulated voltage by regulating the second input voltage based on the second plurality of gate control signals received from the second control circuitry;
first pass-through circuitry coupled to the first voltage rail and the first operating voltage rail;
second pass-through circuitry coupled to the second voltage rail and the second operating voltage rail; and
wherein, based on one or more first control signals, the first pass-through circuitry is to selectively couple the first voltage rail to the first operating voltage rail, the second pass-through circuitry is to selectively couple the second voltage rail to the second operating voltage rail, and the first and second integrated voltage regulators are to be disabled;
a system memory coupled to the processor;
at least one communication device coupled to the processor;
a mass storage coupled to the processor; and
an external voltage regulator coupled to the processor.

2. The system of claim 1, wherein the first pass-through circuitry is to receive the one or more first control signals in a first mode.

3. The system of claim 2, wherein, in a second mode, based on one or more second control signals, the first pass-through circuitry is to selectively decouple the first voltage rail from the first operating voltage rail, the second pass-through circuitry is to selectively decouple the second voltage rail from the second operating voltage rail, and the first and second integrated voltage regulators are engaged to provide the first regulated voltage and the second regulated voltage, respectively.

4. The system of claim 3, wherein operation in the first mode or the second mode is based on a first target operating point for the first processor core and a second target operating point for the second processor core.

5. The system of claim 4, wherein, in the second mode, the first target operating point comprises a first operating voltage and the second target operating point comprises a second operating voltage, and the second operating voltage is different from the first operating voltage.

6. The system of claim 4, wherein, in the first mode, the first target operating point comprises a first operating frequency and the second target operating point comprises a second operating frequency, and the second operating frequency is equal to the first operating frequency.

7. The system of claim 1, wherein the first pass-through circuitry is to complete a bypass path to provide the first input voltage from the first voltage rail to the first processor core via the first operating voltage rail.

8. The system of claim 1, wherein the first integrated voltage regulator comprises a linear voltage regulator.

9. The system of claim 1, wherein the system comprises a mobile device.

10. The system of claim 9, wherein the system comprises a server.

11. A method comprising:
   determining, in a processor of a system having a first processor core, a second processor core, a first integrated voltage regulator and a second integrated voltage regulator, that the first processor core and the second processor core are to operate at least at substantially the same target operating point, the system further comprising a system memory coupled to the processor, at least one communication device coupled to the processor, a mass storage coupled to the processor, and an external voltage regulator coupled to the processor;
   in response to determining that the first processor core and the second processor core are to operate at the at least substantially same target operating point:
      disabling the first integrated voltage regulator, the first integrated voltage regulator comprising:
         first control circuitry to produce a first plurality of gate control signals; and
         a first plurality of p-type MOSFETs (pFETs) coupled to the first control circuitry, each of the first plurality of pFETs to receive a corresponding one of the first plurality of gate control signals, the first plurality of pFETs to generate a first regulated voltage by regulating a first input voltage generated in the external voltage regulator based on the first plurality of gate control signals received from the first control circuitry;
      disabling the second integrated voltage regulator, the second integrated voltage regulator comprising:
         second control circuitry to produce a second plurality of gate control signals; and
         a second plurality of pFETs coupled to the second control circuitry, each of the second plurality of pFETs to receive a corresponding one of the second plurality of gate control signals, the second plurality of pFETs to generate a second regulated voltage by regulating the first input voltage based on the second plurality of gate control signals received from the second control circuitry;
      controlling a first pass-through circuit to selectively provide the first input voltage to the first processor core; and
      controlling a second pass-through circuit to selectively provide the first input voltage to the second processor core.

12. The method of claim 11, further comprising in response to determining that the first processor core and the second processor core are not to operate at the at least substantially same target operating point, engaging the first integrated voltage regulator to provide the first regulated voltage to the first processor core and engaging the second integrated voltage regulator to provide the second regulated voltage to the second processor core.

13. A system comprising:
   a processor comprising:
      a plurality of processor cores formed on a first die, including a first processor core and a second processor core, the first and second processor cores to operate at a corresponding controllable voltage and frequency;
      first integrated voltage regulator means formed on the first die, the first integrated voltage regulator means having a first input means for receiving a first input voltage from a first voltage rail and a first output means for providing a first regulated voltage to the first processor core via a first operating voltage rail, the first integrated voltage regulator means comprising:
         first control means for producing a first plurality of gate control signals; and
         a first plurality of switching means coupled to the first control means, each of the first plurality of switching means for receiving a corresponding one of the first plurality of gate control signals, the first plurality of switching means for generating the first regulated voltage by regulating the first input voltage based on the first plurality of gate control signals received from the first control means;
      second integrated voltage regulator means formed on the first die, the second integrated voltage regulator means having a second input means for receiving a second input voltage from a second voltage rail and a second output means for providing a second regulated voltage to the second processor core via a second operating voltage rail, the second integrated voltage regulator means comprising:
         second control means for producing a second plurality of gate control signals; and
         a second plurality of switching means coupled to the second control means, each of the second plurality of switching means for receiving a corresponding one of the second plurality of gate control signals, the second plurality of switching means for generating the second regulated voltage by regulating the second input voltage based on the second plurality of gate control signals received from the second control means;
      first pass-through means coupled to the first voltage rail and the first operating voltage rail; and
      second pass-through means coupled to the second voltage rail and the second operating voltage rail;
      wherein, based on one or more first control signals, the first pass-through means for selectively coupling the first voltage rail to the first operating voltage rail, the second pass-through means for selectively coupling the second voltage rail to the second operating voltage rail, and the first and second integrated voltage regulator means are to be disabled;

system memory means coupled to the processor;
at least one communication means coupled to the processor;
mass storage means coupled to the processor; and
external voltage regulator means coupled to the processor.

14. The system of claim 13, wherein the first pass-through means is to receive the one or more first control signals in a first mode.

15. The system of claim 14, wherein, in a second mode, based on one or more second control signals, the first pass-through means is to selectively decouple the first voltage rail from the first operating voltage rail, the second pass-through means is to selectively decouple the second voltage rail from the second operating voltage rail, and the first and second integrated voltage regulator means are engaged to provide the first regulated voltage and the second regulated voltage, respectively.

16. The system of claim 15, wherein operation in the first mode or the second mode is based on a first target operating point for the first processor core and a second target operating point for the second processor core.

17. The system of claim 16, wherein, in the second mode, the first target operating point is a first operating voltage and the second target operating point is a second operating voltage, and the second operating voltage is different from the first operating voltage.

18. The system of claim 16, wherein, in the first mode, the first target operating point comprises a first operating frequency and the second target operating point comprises a second operating frequency, and the second operating frequency is equal to the first operating frequency.

19. The system of claim 13, wherein the first integrated voltage regulator means further comprises digitization means for outputting a digital code based on comparison of the first regulated voltage to a reference voltage.

20. The system of claim 19, wherein the first integrated voltage regulator means further comprises comparator means for comparing the first regulated voltage to the reference voltage.

* * * * *